United States Patent [19]

Takenaka et al.

[11] Patent Number: 4,621,263

[45] Date of Patent: Nov. 4, 1986

[54] VIBRATION TELEMETERING SYSTEM

[75] Inventors: Toshio Takenaka, Kobe; Hiroshi Sugimoto, Toyonaka; Yoshinobu Yamanaka, Kobe, all of Japan

[73] Assignee: Mitsubishi Denki Kabushiki Kaisha, Japan

[21] Appl. No.: 635,925

[22] Filed: Jul. 30, 1984

[30] Foreign Application Priority Data

Aug. 12, 1983 [JP] Japan .................. 58-148563

[51] Int. Cl.$^4$ ............................................. G08C 17/00
[52] U.S. Cl. .................... 340/870.07; 73/633; 340/683; 340/870.28
[58] Field of Search ............ 340/683, 518, 825.1, 340/870.07, 870.16, 870.28, 870.29; 73/590, 657, 579, 634; 376/340

[56] References Cited

U.S. PATENT DOCUMENTS 3,783,680  1/1974  Mason .............................. 340/683 X
4,237,454 12/1980  Meyer .............................. 340/683 X

FOREIGN PATENT DOCUMENTS 55-151224 11/1980 Japan .
 58-76799  5/1983 Japan .

OTHER PUBLICATIONS

"Development of Equipment Diagnosis System for Nuclear Power Plant", Hitachi Hyoron, vol. 62, No. 9, Sep. 1980, by Nakamura et al.

*Primary Examiner*—Jerry W. Myracle
*Attorney, Agent, or Firm*—Leydig, Voit & Mayer, Ltd.

[57] ABSTRACT

There is disclosed a vibration telemetering system capable of measuring adverse vibrations of installations or equipment in a plant such as a nuclear power plant. The system includes a vibrometer which measures the vibrations in a non-contacting fashion. The direction at which the vibrometer faces is adjusted by an angle adjusting mechanism which is mounted on a travelling unit running along a predetermined inspection route in the plant. A measured signal from the vibrometer is transmitted to a remote control room through a communication system and is used for evaluating whether or not the state of the plant is normal. The remote control room can control the travelling unit and the angle adjusting mechanism through the communication system in order to monitor the vibrations of a plurality of places along the predetermined inspection route.

9 Claims, 2 Drawing Figures

VIBRATION TELEMETERING SYSTEM

BACKGROUND OF THE INVENTION

This invention relates to a vibration telemetering system and in particular to a vibration measuring system for telemetering any vibration of installations or equipment within a plant.

As is well known, to detect abnormalities in the operation of such plants as nuclear power plants etc., measurements of undesirable vibrations of the equipment in the plant are carried out. In checking for abnormal vibrations, it has heretofore been done by a man patrolling a plant, and using a vibrometer. Namely, a patroller carrying a vibrometer measures the vibrations of installations or equipment within the plant such as pipes, valves, pumps, heat exchanger etc. and compares the measured results with respective tabulated vibration values designating normal states to determine whether or not any abnormalities exist. In this case, a contacting type of vibrometer which is convenient for carrying around is employed, the contacting vibrometer having its detection head electrically connected to the vibrometer, the head being directly pressed against an object to be measured to provide a reading at that time.

As mentioned above, the conventional monitoring operation for vibrations has been made by a man patrolling a plant, so that it is inevitable that certain measurements will be misrecorded, misread, or that certain measurements will be missed altogether. Further, especially in places where there is danger of radiation exposure such as in a nuclear containment vessel of a nuclear power plant, it is disadvantageously difficult to monitor such vibrations since a man can not easily get into the containment vessel.

On the other hand, another method considers vibration sensors which are previously mounted at places to be monitored wherein signals from the sensors are transmitted to a central control room. However, this method is not preferable because of the fact that the places to be monitored actually depend on the status of the apparatus at that time, and because if such sensors were mounted on all the possible places, enormous number of sensors and signal transmission cables would be required.

Furthermore, an article appearing in "Hitachi Hyoron", Vol. 62, No. 9, September 1980 by Nakamura etc. discloses a nuclear reactor acoustic vibration monitoring apparatus developed as a "loose parts monitor" for detecting the generation of abnormal vibrations and loose parts during the early stages thereof while in another section of the article, it separately discloses an inspection system within a nuclear reactor containment vessel which includes a mobile station having mounted thereon a detector such as a TV camera, a trolley chain for pulling the mobile station, a console for remote-controlling the system in its entirety, and a computer for processing the result while checking the equipment in the nuclear reactor containment vessel. As an acoustic emission and vibration detector, a piezo-electric device or an acceleration meter resistant to heat or radiation may be generally employed as disclosed in Japanese Patent Application Laid-open No. 55-151224 which corresponds to the U.S. patent application Ser. No. 36,715, now U.S. Pat. No. 4,304,629. The above article has the disadvantage that in order to measure the vibration of equipment by such a travelling type apparatus, a vibration sensor such as a piezo-electric device has to be mounted on a robot arm and directly pressed against the surface of the equipment.

Japanese Patent Application Laid-Open No. 58-76799 teaches how to make a display corresponding to a surface temperature at a position on a TV picture image corresponding to a measured place of a monitored object in the equipment.

SUMMARY OF THE INVENTION

The present invention has been made to overcome the above noted prior art disadvantages by measuring adverse vibrations of installations or equipment in a plant by means of a non-contacting type vibrometer where the measured signal is monitored in a remote location without any direct inspection by an operator of dangerous places in the plant.

In achieving this, the present invention provides a vibration telemetering system comprising a travelling means for running along a predetermined inspection route; an angle adjusting means mounted on the travelling means; a vibrometer mounted on the angle adjusting means, for measuring the vibration of a measured object in a non-contacting fashion, the vibrometer being moved by the adjusting means so that it faces the object to be tested; and communication means for providing as output control signals therefrom respective control signals for controlling the travelling means and the angle adjusting means and for receiving as a detection input signal a measured value from the vibrometer; and, monitoring means for causing said communication means to develop said control signals and for receiving the measured value out of the vibrometer through the communication means and for evaluating from the measured value if the state of the measured object is normal.

BRIEF DESCRIPTION OF THE DRAWINGS

The present invention will be more readily apparent from the preferred embodiment as illustrated in the accompanying drawings in which.

Throughout the figures, the same reference numerals indicate identical or corresponding portions.

DETAILED DESCRIPTION OF THE PREFERRED EMBODIMENTS

The preferred embodiments according to the present invention will now be described in detail with reference to the drawings.

Figure 1:
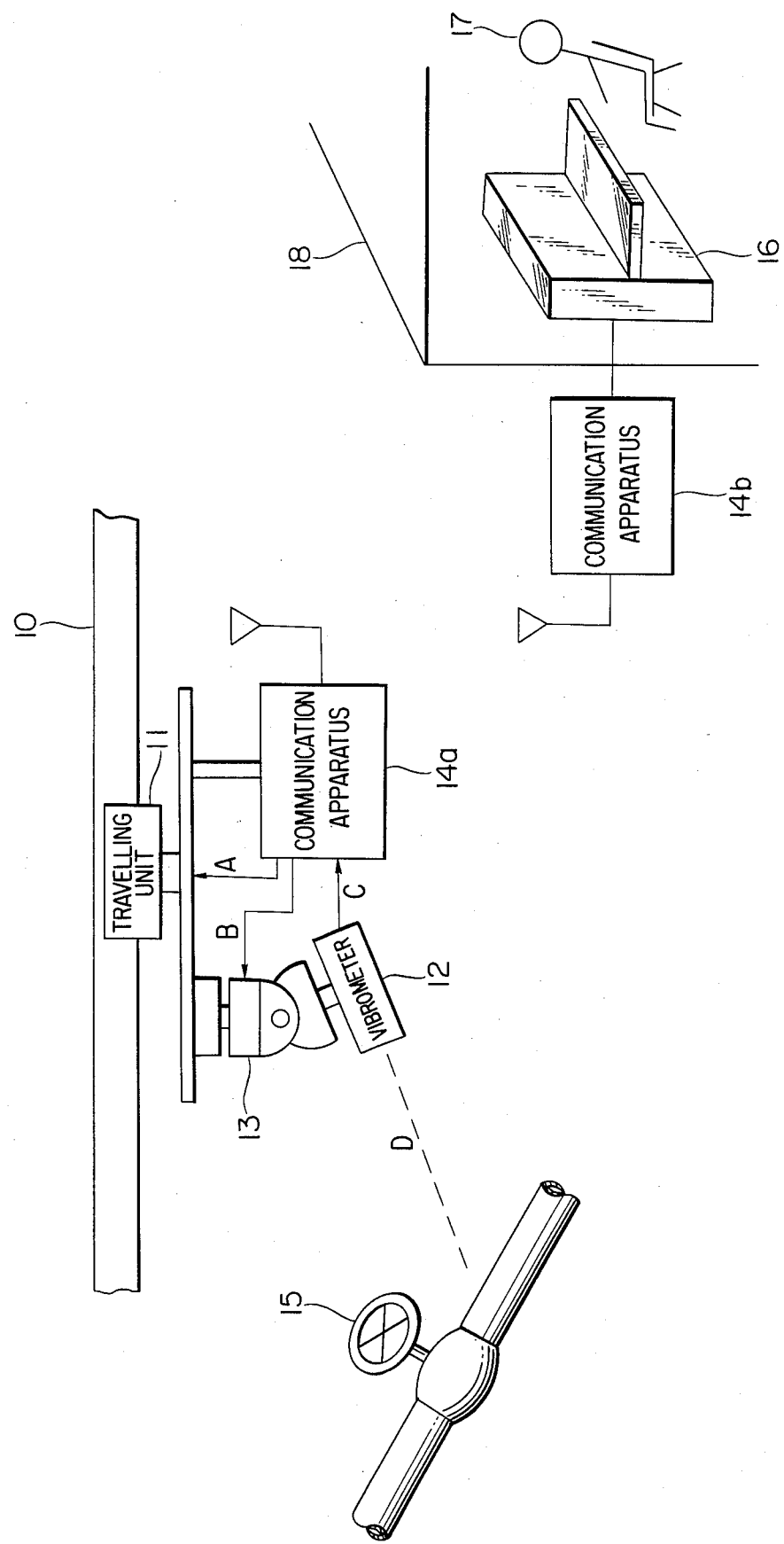
FIG. 1 shows a diagram of one preferred embodiment of a vibration telemetering system according to the present invention; and, FIG. 2 shows a diagram of another preferred embodiment of a vibration telemetering system according to the present invention.

In FIG. 1, generally showing a vibration telemetering system according to the present invention, a rail 10 is laid along a predetermined patrolling inspection route (not shown) in a plant, and a travelling unit 11 runs along the rail 10. A non-contacting type vibrometer 12 is driven in the detecting direction thereof by an angle adjusting mechanism 13 which is mounted on the travelling unit 11. The travelling unit 11, the angle adjusting mechanism 13, and the vibrometer 12 are electrically connected to a communication apparatus 14a. The communication apparatus 14a provides as an output therefrom a control signal A which runs or stops the travelling unit 11, and a control signal B which controls the angle adjusting mechanism 13 so as to freely adjust the direction or orientation D of the vibrometer 12, that is, the up and down as well as right and left movements of the vibrometer 12. The vibrometer 12 observes or monitors an object 15 such as a valve in the plant and provides as an output a detection signal C regarding the object 15 to the communication apparatus 14a. The communication apparatus 14a is coupled to another communication apparatus 14b which is connected to a control board 16 operated by an operator 17 in a monitoring control room 18.

In operation, the operator 17 operates the control board 16 to cause the control signal A to be provided by remote control fashion, through the communication apparatuses 14a, 14b both forming a communication system, to cause the travelling unit 11 to run along the rail 10. When the travelling unit 11 reaches an inspection or check point, the operator 17 stops in a remote control fashion the travelling unit 11 by monitoring the travelled distance thereof along the rail 10 which can be observed on the control board 16. Then the operator 17 operates the control board 16 to cause the control signal B to be generated in a similar manner in order to control the angle adjusting mechanism 13 which directs the vibrometer 12 towards a certain place of the measured object 15 to measure the vibration of the object. As a result, the vibrometer 12 generates a detection signal C which is received by the control board 16 through the communication apparatuses 14a, 14b and is used for displaying and monitoring the detected data.

Such an operation is sequentially conducted by the operator 17 for all installations or equipment requiring an inspection whereby the operating state of the plant can be exactly observed by checking the measurements with reference values to realize a quicker discovery of an abnormality.

It is to be noted that in the figures there is shown no driving apparatus for moving the travelling unit 11 while the travelling unit 11 per se may be of a self-running type having a driving apparatus mounted thereon, such as a motor, or alternatively of an externally-driving type provided at the end of the rail 10 with a drive system for driving the travelling unit 11 by means of a chain spanned between the travelling apparatus and the external driving apparatus. In the former case, as the travelling apparatus, a product "Pana Wagon RD-PW400" manufactured by a Japanese company called Matsushita Electric Co., Ltd. is commercially available while in the latter case, as the travelling apparatus, a product "Auto Run A-100" manufactured by a Japanese company called Tsubakimoto Chain is commercially available. As the angle adjusting mechanism 13, a product "a motor driven apparatus for a portable TV camera, PTH-2N" manufactured by a Japanese company called Mikami is commercially available. The communication apparatuses 14a, 14b, may be either of a wired type directly connecting the apparatuses 14a and 14b through a cable to each other, or of a wireless type using radio waves. Either of the types may well be selected according to the particular conditions. In the latter case, a product "Radio Data Transmission Apparatus, TDM-24" manufactured by a Japanese company called Tokyo Denshi Kogyo Co., Ltd. is commercially available.

Also as the non-contacting vibrometer 12, there have been developed various ones such as the, "Opto-follow Model 500M" which is commercially available and manufactured by a Japanese company called YA-MAN Limited using the detection of the edge of an optical image obtained by a high speed image device and one using a micro-wave. However, in the present invention, a Laser Doppler Vibrometer is preferable which is manufactured by a Danish company called DISA and is commercially available.

Such a Laser Doppler Vibrometer projects a laser beam to a vibrating object and detects the shift of a Doppler frequency in the reflected light from the object using the opto-heterodyne technique, so that an output proportional to the rate of vibration is obtained due to the reflected light having a frequency shift corresponding to a rate component in the direction of light axis on the surface of the object. The amount of the frequency shift, is independent of the distance between the vibrometer and the object, and, accordingly, can be measured at a any distance as long as the reflected light of the laser beam is returned with some strength.

Therefore, in this invention, the control of the travelling unit 11 and the angle adjusting mechanism 13 as well as the projection of a laser beam onto the surface of an object will allow the vibration of the body at a remote location to be measured.

According to the above preferred embodiment of a vibration telemetering system of the present invention, it is possible to perform the vibration monitoring of installations or equipment in a plant at a remote location, while if a TV camera is mounted on the travelling mechanism, the direction or orientation of the non-contacting vibrometer can be easily confirmed, resulting in a more convenient operation.

Figure 2:
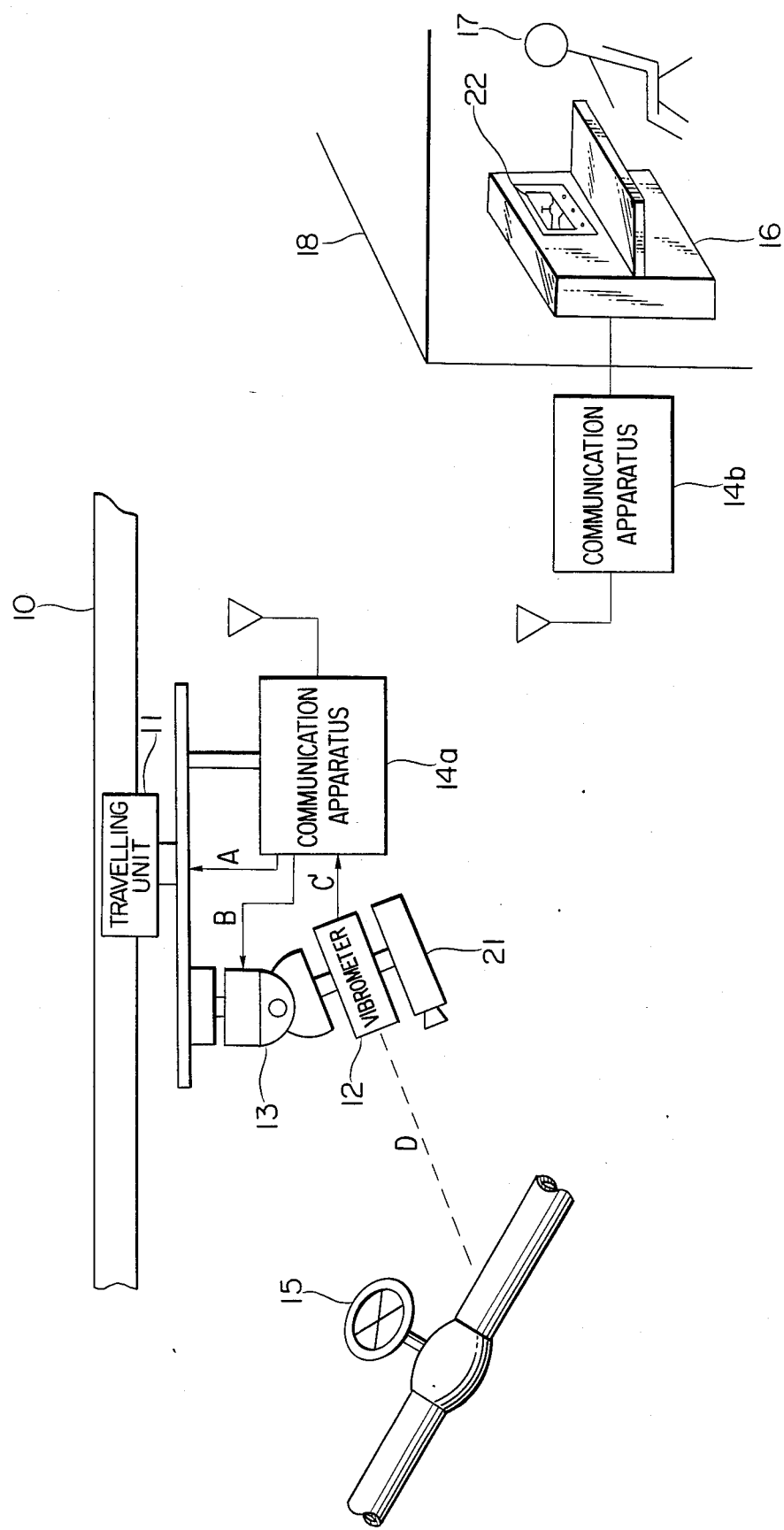

In view of this, another embodiment of a vibration telemetering apparatus in which a TV camera is mounted on the travelling unit 11 is shown in FIG. 2. In the figure, the TV camera 21 is fixedly mounted on the lower side of non-contacting vibrometer 12 so that when the adjusting mechanism 13 moves the vibrometer 12, the camera 21 moves therewith. The camera 21 is mounted so that the lens thereof face in the same direction as the detecting face of the vibrometer 12. The control board 16 is further provided with a monitoring TV set 22 for monitoring an image signal C' from the TV camera transmitted from the communication apparatus 14a to the apparatus 14b. This enables the operator 17 looking at the TV set 22 to recognize at a glance the vibration of the object 15 to be monitored, since the TV camera always faces at the same direction as the vibrometer 12, thereby advantageously resulting in a more convenient and manageable operation.

It is to be noted that in the above embodiment, the TV camera 21 is mounted on the same angle adjusting mechanism 13 as the non-contacting vibrometer 12. However an additional angle adjusting mechanism may be provided so that both mechanisms are independently controlled to face the same direction.

It is also to be noted that the above embodiments have been described assuming a man operates the system. However an automatic diagnosis system may be realized by preliminarily determining locations of objects to be monitored, storing data representative of the determined locations and data representative of standard vibration values, automatically controlling the travelling unit to run along a predetermined route according to the stored location data, measuring the vibration of the objects at the predetermined places, and comparing the actual vibration values with the stored standard values to determine whether or not any malfunctions exist.

Further, although a travelling mechanism of a rail-use type has been described, a travelling mechanism as a movable means running on the floor of a plant along an inspection route may well be used.

As described above, in the present invention, since a non-contacting vibrometer can be moved by a travelling unit to any place and the direction of the vibrometer can be adjusted by an angle adjusting mechanism, a safe monitoring system is realized without requiring the installation of numerous sensors even when monitoring environments where no one can get in. Further, since in the present invention the places to be monitored by the vibrometer are also monitored with a TV camera, the monitored places can be easily recognized and the measuring operation can be easily made.

What we claim is:

1. A vibration telemetering system comprising:
   a travelling means for running along a predetermined inspection route;
   an angle adjusting means mounted on said travelling means;
   a vibrometer, mounted on said angle adjusting means, for measuring the vibration of an object in a non-contacting fashion, said vibrometer being moved by said adjusting means so that the detecting face of said vibrometer may be directed towards said object;
   communication means for providing as outputs therefrom respective control signals for controlling said travelling means and said angle adjusting means and for receiving as a detection input signal a measured value from said vibrometer; and,
   monitoring means for causing said communication means to develop said control signals and for receiving the measured value from said vibrometer through said communication means and for evaluating from the measured value if the state of said measured object is normal.

2. A vibration telemetering system according to claim 1 wherein said travelling means comprises:
   a rail which is laid along said predetermined inspection route.

3. A vibration telemetering system according to claim 1 wherein said travelling means comprises:
   movable means which runs on the floor along said predetermined inspection route.

4. A vibration telemetering system according to claim 1 wherein said vibrometer is of a Laser Doppler type.

5. A vibration telemetering system according to claim 1 wherein said measured object is an installation or equipment of a nuclear power plant.

6. A vibration telemetering system according to claim 1 wherein said communication means is of a wire system.

7. A vibration telemetering system according to claim 1 wherein said communication means is of a wireless system.

8. A vibration telemetering system according to claim 1 wherein said system further comprises:
   a TV camera mounted on said angle adjusting means for producing an image signal of the measured object to be transmitted through said communication means to said monitoring means so that the direction to which the face of said vibrometer is positioned may be confirmed.

9. A vibration telemetering system according to claim 8 wherein said monitoring means further comrises;
   a TV set for visually confirming the direction at which said vibrometer looks.

* * * * *